No. 843,737. PATENTED FEB. 12, 1907.
G. B. ELLIOTT.
DRAFT EQUALIZER.
APPLICATION FILED JULY 30, 1906.
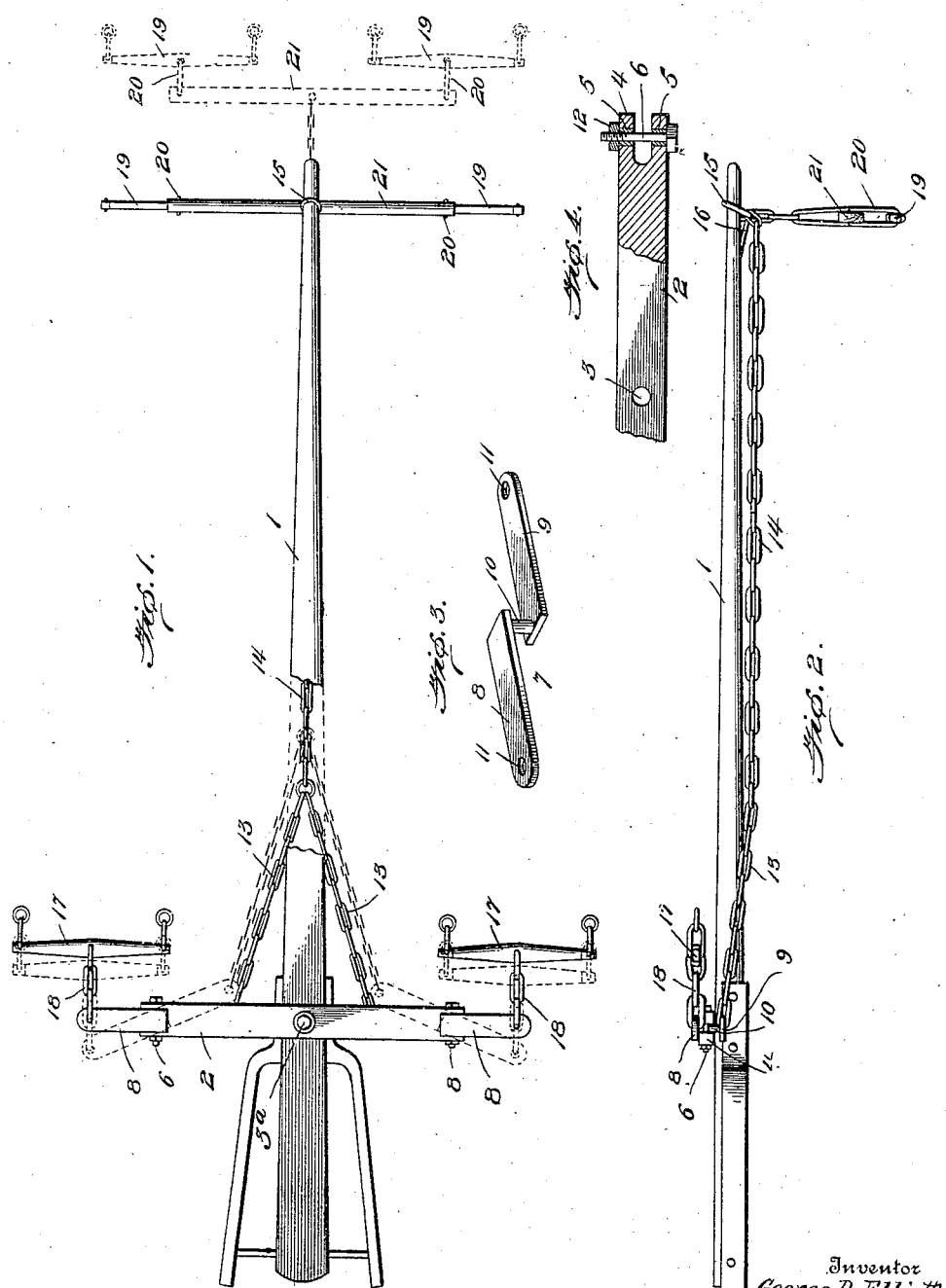
Witnesses
Inventor
George B. Elliott
By Edwin E. Vrooman.
his Attorney.

UNITED STATES PATENT OFFICE.

GEORGE B. ELLIOTT, OF BARNEY, NORTH DAKOTA.

DRAFT-EQUALIZER.

No. 843,737.  Specification of Letters Patent.  Patented Feb. 12, 1907.

Application filed July 30, 1906. Serial No. 328,447.

*To all whom it may concern:*

Be it known that I, GEORGE B. ELLIOTT, a citizen of the United States, residing at Barney, in the county of Richland and State of North Dakota, have invented certain new and useful Improvements in Draft-Equalizers, of which the following is a specification, reference being had therein to the accompanying drawings.

This invention relates to improvements in draft-equalizers, and has for its object the provision of means for facilitating the distributing of the weight to be conveyed equally upon each draft-animal.

With this and other objects in view the invention consists of certain other novel constructions, combinations, and arrangements of parts, as will be hereinafter more fully described and claimed.

In the drawings, Figure 1 is a top plan view of an equalizer constructed in accordance with the present invention. Fig. 2 is a view in side elevation of the apparatus depicted in Fig. 1. Fig. 3 is a perspective view of one of the eveners. Fig. 4 is a fragmentary view of the draft-bar, showing one end thereof in section.

Referring to the drawings, 1 designates a tongue of any ordinary structure, upon which is mounted a draft-bar 2.

The draft-bar is provided with a central aperture 3, Fig. 4. Any suitable fastening means, as an ordinary bolt 3ª, is positioned within aperture 3 and a registering aperture of the tongue. The parallel extensions of each end 4, producing a bifurcated structure, are provided with apertures extending at right angles to aperture 3, and within these apertured portions of the bifurcated ends there are preferably positioned sleeves 5 5, which materially reinforce these apertured ends of the draft-bar 2 for accommodating removable bolts 6.

Eveners 7 are secured within the bifurcated ends of the draft-bar 2 through the medium of said bolts 6. Each evener comprises an upper flat portion 8 and a lower flat portion 9. The portions 8 and 9 are integrally connected at their inner ends by means of a vertical round shaft 10. Each of the portions of the evener is provided at its outer end with an aperture 11. When it is desired to position the eveners 7 upon the draft-bar 2, the vertical shafts 10 are positioned within the bifurcated ends of said draft-bar, and subsequently the bolts 6 are positioned within the horizontal apertures of the draft-bar 2, which apertures preferably contain reinforcing-sleeve 5. The nuts 12 are threaded upon said bolts for securely retaining the bolts and eveners in their assembled position upon the draft-bar 2.

Auxiliary sections 13 13 of a draft-chain 14 are connected at their outer ends to the lower portions 9 of the eveners 7 by the outer links being positioned within the apertures 11. Said chain 14 constitutes a flexible member, which is provided at its inner end with separate flexible sections that are connected to said flexible member at only their inner ends. The chain 14 is provided with a ring 15 near its outer end, which ring is adapted to be passed over the outer end of tongue 1 when it is desired to use only two draft-animals. When the ring 15 is passed over the end of the tongue and a pull is exerted upon the eveners 7, the said ring 15 will engage the stud 16, Fig. 2, and thereby its sliding movement upon said tongue is limited. This position is when only two draft-animals are used, and the eveners in this position are parallel with the draft-bar 2, Figs. 1 and 2.

To attach a draft-animal to each evener, a whiffletree 17 is preferably connected to the outer apertured end of the upper portion 8 of each evener by means, preferably, of a chain 18.

When it is desired to use four draft-animals, the ring 15 is removed from the end of the tongue and two extra draft-animals are attached or hitched to the outer whiffletrees 19 19. These whiffletrees 19 are attached by any suitable means—as, for instance, links 20—to the doubletree 21. The doubletree 21 is attached to the outer end of chain 14. If only two draft-animals are employed, the doubletree 21 and the whiffletree 19 will be hung from the end of the tongue, Figs. 1 and 2, by placing the ring 15 over the end of said tongue. It will therefore be obvious that the ring 15 performs two functions—to wit, limiting rearward movement of chain 14, and consequently of portions 9, and also providing means for suspending the outer whiffletrees 19 and doubletree 21 when not in use upon the tongue 1.

When four draft-animals are hitched to my equalizer, the outer team or pair will not receive the weight of the load from the outer end of the tongue; but through the peculiar construction of the eveners 7 and the flexible attaching means, whereby the doubletree 21 is secured to said eveners, the weight or draft on the lead team will be comparatively near the load, in fact, as near the load as the draft-animals attached to the whiffletrees 17.

By reason of the peculiar structure of each evener the function is somewhat similar to a compensating device, as any uneven movement of one draft-animal will be taken up by the whole apparatus and obviate any jarring or jerking, as would be the case if the eveners were rigid with the draft-bar 2 or the tongue 1.

In Fig. 1 I have shown the doubletree 21 and the whiffletrees 19 in their extended position in dotted lines, as when attached to draft-animals. The eveners 7 and the whiffletrees 17 are also shown in dotted lines in the position as when an outward pull is given to chain 14 and the whiffletrees 17 are moved rearwardly. These eveners 7 swing freely upon the bifurcated ends of the draft-bar 2.

What I claim is—

1. In a draft-equalizer, the combination with a tongue, of a draft-bar carried by said tongue, eveners pivotally mounted upon said draft-bar, each evener comprising an upper and a lower portion, a vertical shaft connecting said portions near their inner end, each portion provided with an aperture formed therein near its outer end, flexible means connecting said eveners, and means for directly attaching a draft-animal to said flexible means.

2. In a draft-equalizer, the combination of a tongue, a draft-bar pivotally mounted upon said tongue, said draft-bar provided with bifurcated ends, eveners positioned within the bifurcated ends of said draft-bar, removable fastening means securing said eveners within said ends, each evener comprising an upper and a lower, flat portion, a shaft integral with the inner ends of said portions, whiffletrees, means connecting said whiffletrees to the upper portions of said eveners, and means for directly attaching a draft-animal to the lower portions of said eveners.

3. In a draft-equalizer, the combination with a tongue, of a draft-bar carried by said tongue, eveners carried by said draft-bar, each of said eveners comprising an upper and a lower portion, whiffletrees, means connecting said whiffletrees to the upper portions of said eveners, a flexible member, means connecting the inner end of said flexible member to the lower portions of said eveners, a ring secured to said flexible member and adapted to be positioned upon the end of said tongue for limiting pivotal movement of said eveners, a whiffletree, and means connecting said whiffletree to the flexible member near said ring.

4. In a draft-equalizer, the combination with a tongue, of a pivotally-mounted draft-bar carried by said tongue, said draft-bar provided with bifurcated ends, each end provided with horizontal apertures, sleeves positioned within the apertured ends of said draft-bar, eveners pivotally mounted within the bifurcated ends of said draft-bar, removable fastening means positioned within said sleeves and securing said eveners upon said draft-bar, whiffletrees, means connecting said whiffletrees to said eveners, and means for limiting pivotal movement of said eveners.

5. The combination with a tongue, of a draft-bar carried by said tongue, eveners pivotally mounted upon said draft-bar, each evener provided with an upper and a lower portion, whiffletrees, means connecting said whiffletrees to the upper portions of said eveners, a doubletree, means connecting said doubletree to the lower portions of said eveners, whiffletrees, and means connecting said whiffletrees to said doubletree.

6. In a draft-equalizer, the combination with a tongue, of a draft-bar pivotally mounted upon said tongue, eveners pivotally mounted upon said draft-bar, each evener comprising an upper and a lower portion, a vertical shaft integral with said portions, a chain, chain-sections connected at their outer end to the lower portions of said eveners and at their inner ends to said chain, means for attaching draft-animals to the upper portions of said eveners, and means for attaching draft-animals to said chain.

7. In a draft-equalizer, the combination with a tongue, of a draft-bar carried by said tongue, eveners mounted upon said draft-bar, each evener provided with a portion extending through said draft-bar and with portions extending in opposite directions upon opposite sides of said draft-bar, means for attaching draft-animals to the outer ends of said eveners, and means for attaching a draft-animal to the inner ends of said eveners.

8. In a draft-equalizer, the combination with a tongue, of a draft-bar carried by said tongue, eveners pivotally mounted upon said tongue and extending in opposite directions upon the upper and lower sides thereof, means for attaching draft-animals to said eveners, means connecting the inner ends of said eveners, and means for attaching a draft-animal to the inner ends of said eveners.

9. In a draft-equalizer, the combination with a tongue, a draft-bar carried by said tongue, of eveners pivotally mounted upon said draft-bar and extending in opposite directions upon the upper and lower sides thereof, means for attaching draft-animals to said eveners, and means for holding said eveners substantially parallel with said draft-bar, and in operative position with said bar and said tongue.

10. In a draft-equalizer, the combination with a tongue, a draft-bar carried by said tongue, of eveners pivotally mounted upon said draft-bar, each evener extending in opposite directions upon opposite sides of said draft-bar, and means connecting said eveners.

In testimony whereof I hereunto affix my signature in presence of two witnesses.

GEORGE B. ELLIOTT.

Witnesses:
R. N. INK,
N. L. CARTER.